United States Patent
Kennedy

(10) Patent No.: US 6,254,060 B1
(45) Date of Patent: *Jul. 3, 2001

(54) GATE ASSEMBLY FOR A DOUBLE DISK GATE VALVE

(75) Inventor: Paul G. Kennedy, Horseheads, NY (US)

(73) Assignee: Penn Troy Machine Company, Inc., Troy, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/405,532

(22) Filed: Sep. 24, 1999

Related U.S. Application Data

(63) Continuation of application No. 09/095,791, filed on Jun. 11, 1998, now Pat. No. 5,971,358.

(51) Int. Cl.$^7$ .................................................... F16K 25/00
(52) U.S. Cl. ........................................ 251/197; 251/326
(58) Field of Search .................................. 251/193, 195, 251/197, 326

(56) References Cited

U.S. PATENT DOCUMENTS

| | | | |
|---|---|---|---|
| 1,778,070 | 10/1930 | Fisk . | |
| 2,424,210 | 7/1947 | Sutton | 251/159 |
| 2,865,597 | * 12/1958 | Lucas | 251/197 |
| 3,027,135 | * 3/1962 | Kellar | 251/328 X |
| 3,160,390 | 12/1964 | Banks | 251/334 |
| 3,476,358 | * 11/1969 | Westerland et al. | 251/326 X |
| 3,662,778 | * 5/1972 | Leopold, Jr. et al. | 137/375 |
| 3,763,880 | * 10/1973 | Leopold, Jr. et al. | 137/316 |
| 3,854,697 | * 12/1974 | Salloga et al. | 251/197 X |
| 3,963,214 | 6/1976 | Hackman et al. | 251/326 |
| 4,067,542 | 1/1978 | Morrison | 251/328 |
| 4,136,852 | 1/1979 | Grenier | 251/189 |
| 4,219,046 | * 8/1980 | West et al. | 137/375 |
| 4,225,114 | * 9/1980 | Barthelemy et al. | 251/308 X |
| 4,483,514 | 11/1984 | Kennedy | 251/327 |
| 4,532,957 | * 8/1985 | Battle et al. | 137/375 |
| 4,580,593 | * 4/1986 | Herberholz | 137/375 |
| 4,763,877 | * 8/1988 | Kennedy | 251/306 X |
| 4,913,400 | 4/1990 | Tiefenthaler | 251/175 |
| 4,972,577 | 11/1990 | Dierikx | 29/890.09 |
| 5,085,403 | 2/1992 | Dierikx | 251/327 |
| 5,226,441 | * 7/1993 | Dunmire et al. | 137/271 X |
| 5,582,200 | * 12/1996 | Kimpel et al. | 137/375 |
| 5,971,358 | * 10/1999 | Kennedy | 251/197 |

FOREIGN PATENT DOCUMENTS

WO 84/02167   6/1984   (WO) .

* cited by examiner

Primary Examiner—Kevin Shaver
Assistant Examiner—David A. Bonderer
(74) Attorney, Agent, or Firm—Brown & Michaels, PC

(57) ABSTRACT

A gate assembly for a double disk gate valve having two closure disks with a resilient material between. The resilient material and closure disks are enveloped in an outer harder coating. Closing the gate valve brings the disks into initial sealing contact with the bottom of the valve seat. Applying pressure to the gate valve after contact is made between the gate assembly and the valve seat causes the resilient central member to exert pressure against the closure disks, thus pressing the outer coating of the gate assembly against the sidewalls of the valve seat. This action creates a better sealing engagement with the seat surface to exclude flow. Wear on the gate assembly is significantly reduced since the gate assembly does not make contact with the sidewalls of the seat while being moved between an open position and a closed position.

26 Claims, 2 Drawing Sheets

GATE ASSEMBLY FOR A DOUBLE DISK GATE VALVE

This is a continuation application of patent application Ser. No. 09/095,791, filed Jun. 11, 1998, entitled "GATE ASSEMBLY FOR A DOUBLE DISK GATE VALVE", now U.S. Pat. No. 5,971,358. The aforementioned application is hereby incorporated herein by reference.

FIELD OF THE INVENTION

The invention pertains to a gate valve. More particularly, the invention pertains to a double disk gate valve having a resilient deformable sealing central member inside a gate assembly that improves the sealing characteristics of the valve and reduces wear on the gate assembly.

BACKGROUND OF THE INVENTION

Technological improvements in industry require accurate control of the flow of high-pressure fluids or gasses. Gate valves are typically used where the flow of fluid or gas is seldom interrupted, so that the quantity of flow is the main consideration. Gate valves allow maximum flow while exercising control through the closure of a sliding gate transverse to the flow. The gate is user controlled either through a spindle screw or other means so as to allow adjustments in flow rate. The primary advantage of a gate valve is that the original flow rate of the fluid or gas is not impaired by installing the valve body.

Various types of gate valve assemblies are known for opening and closing pipelines to control the flow of fluid or gas. The traditional gate valve body provided a single metallic disk capable of stopping the flow of a liquid or gas through an inlet port and out through an outlet port by movement of the gate valve into a closed position transverse to flow from the inlet port. The single disk is typically mounted with a little play such that the uneven pressure on one side of the disk from the inlet side acts to deform the gate or the seat into which it slides when in a closed position. This deformation can allow leakage, and force repair or replacement. Alternatively, the use of a single metal disk to seal off flow can be hindered due to rubbing of the disk against the seating surfaces of the valve body, and in this way, slowly damages the single disk or seating surface such that the gate valve body does not adequately restrict flow and prevent leakage.

U.S. Pat. No. 4,483,514, "GATE VALVE MEMBER FOR RESILIENT-SEATED GATE VALVE", by the inventor of the present invention, shows a prior-art gate valve.

One attempt to efficiently prevent leakage or deformation is a gate valve assembly having two disks. The disks are disposed between two opposite seat surfaces, each facing either an inlet port or an outlet port. When actuated, the double disk construction sealingly engages the respective seat surface as the gate assembly moves into a closed position. The disks may be pressed outwards against the seats by a spring assembly, or by fluid pressure introduced between the disks.

U.S. Pat. No. 4,913,400, "DOUBLE DISK GATE VALVE", issued in 1990 to Tiefenthaler, shows a prior art double-disk gate valve which is biased outward by fluid pressure.

Gate valve assemblies employing double disk closure gates are further improved through the incorporation of resilient sealing material around the periphery of the disks themselves. When the gate assembly is put into a closed position, the resilient materials located on the peripheral surfaces of the gate are deformed through the application of pressure, thereby helping to provide a tighter seal between the seat surfaces and the gate assembly than accomplished by bare disks of the gate assembly.

However, these configurations employing resilient sealing members around the periphery of a seat ring must be constructed to within narrow tolerances to insure appropriate sealing characteristics. The tolerances must be even more precise when the side wall portions of the seat surface as formed by the seat recess sidewall are considered. The prior art typically mounts these resilient members on the periphery of the gate assembly, making the dimensional tolerances of the resilient member very narrow, to prevent compression of the resilient member beyond its elastic limit. This maintenance of narrow tolerances for resilient sealing members requires significant manufacturing oversight, is time-consuming, and is an expensive factor limiting the application of double disk gate valves.

In addition, the prior art teaches the construction of the double disk valve assembly essentially of metal. This construction is expensive and makes the valve body installed very heavy.

SUMMARY OF THE INVENTION

The invention presents a double disk gate valve in which the gate has a resilient central member sandwiched between the two closure disks, with a stem nut and cross-member across the top of the gate assembly. The stem of the gate valve, interacting with the stem nut, causes the gate to slide transversely across a conduit from an open position out of the fluid flow, and into a closed position in contact with a valve seat. Closing the gate valve brings the disks into initial sealing contact with the valve seats. Further downward pressure by the valve stem after contact is made between the gate assembly and the valve seat, pushes the stem nut and cross member downward, squeezing the resilient central member, thus exerting outward pressure which pushes the disks against the valve seats. A central rigid tube surrounds the valve stem as it passes through the gate assembly, preventing the resilient material from exerting inward pressure on the valve stem as it is squeezed by the cross member.

This action creates a better sealing engagement with the seat surface and excludes flow. Wear on the gate assembly is significantly reduced since the gate assembly does not make contact with the sidewalls of the seat while being moved between an open position and a closed position.

To prevent the effects of corrosion and wear, the resilient central member and closure disks are enveloped in an outer rubber coating.

DESCRIPTION OF THE PREFERRED EMBODIMENT

Figure 1:
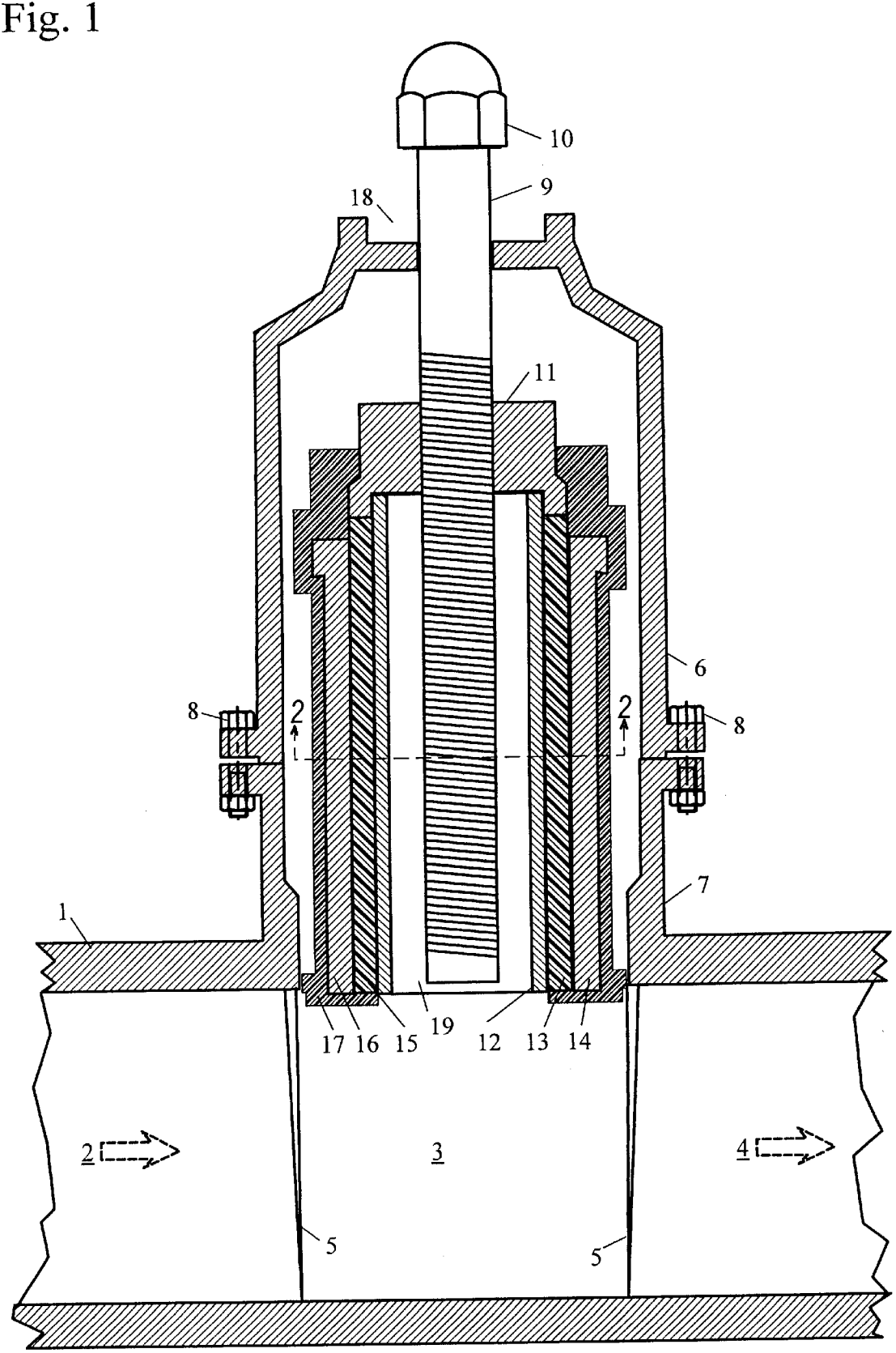
FIG. 1 shows a side cut-away view of a double disk gate valve of the present invention, showing the gate in a partially open position.
Figure 2:
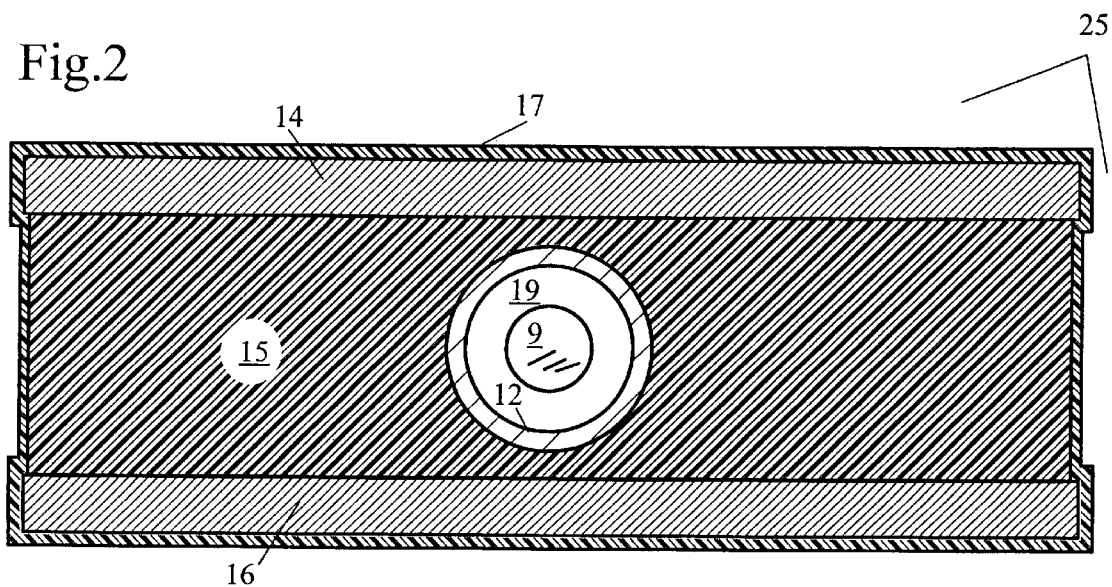
FIG. 2 shows a bottom cut-away view of the gate assembly of the present invention, along the lines 2—2 in FIG. 1.

Referring to FIG. 1, the double disk gate valve of the invention is mounted in a pipe (1), by conventional means (not shown) such as flanges, threads, etc. Fluid flows from an inlet (2), through the gate chamber (3), and out an outlet (4) (although, of course, the fluid flow need not be constrained to flow only in this direction—the terms "inlet" and "outlet" are used for convenience, only). For ease of assembly, the valve body is split into upper (6) and lower (7) sections above the gate chamber (3), attached together by conventional means such as bolts (8).

The valve stem arrangement is conventional. A valve stem (9), with any conventional operational fitting such as the hex head (10) shown, serves to raise and lower the gate assembly (25) into and out of the gate chamber (3). As shown in FIG. 1, the valve may use a stationary rotating threaded stem, fitting into a threaded stem nut (11), in which the stem (9) rotates in place, and the gate assembly (25), driven by the threaded stem nut (11), rides up and down along the stem (9), which extends through an opening (19) in the center of the gate assembly (25). In such a case, a simple seal or sealed bearing is provided at the point (18) in the housing (6) where the stem (9) leaves the housing (6). Alternatively, the point (18) might contain the threads and the stem nut (11) a swivel connection, and the stem (9) would rise and fall above the valve body; or the stem (9) could be directly linearly activated by a rack or hydraulic mechanism.

Figure 3:
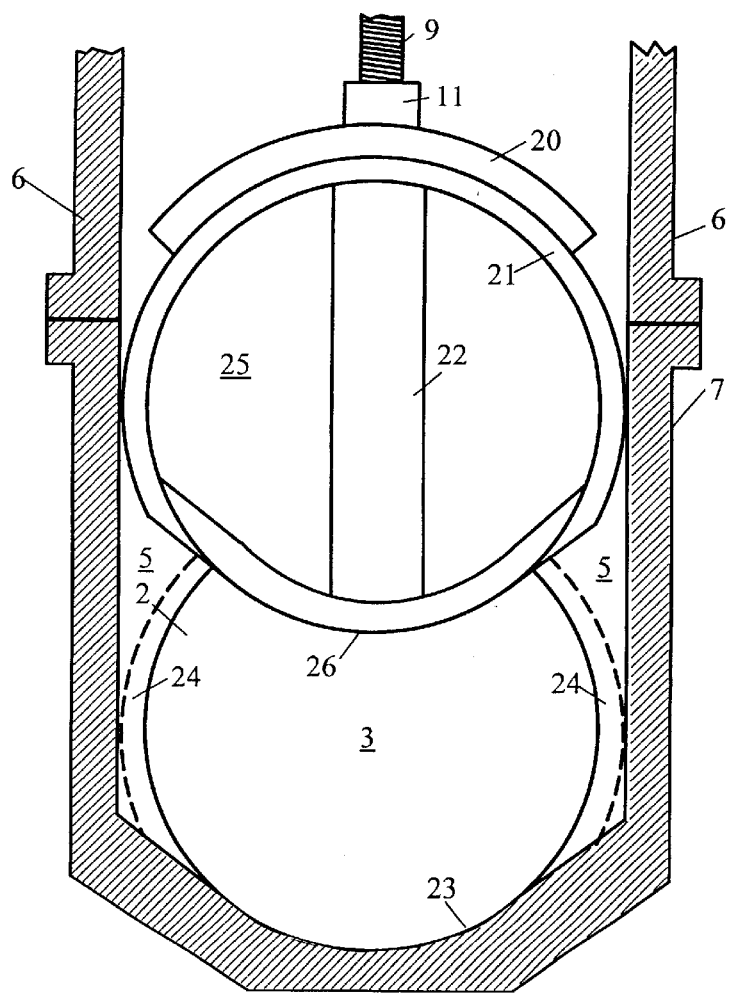
FIG. 3 shows an end view of the double disk gate valve of the present invention, cutting through the valve housing to show the valve chamber and seat.

The gate assembly (25), when slid into the gate chamber (3), makes contact with the seal areas (5) on the up- and down-stream sides of the gate chamber (3), closing off fluid flow. FIG. 3 shows the gate assembly in a partially lowered position. As can be seen in that figure, seal area(5) extends to either side of the circular inlet pipe (shown as (2), extending into the paper) and outlet pipe ((4) in FIG. 1, located above the page in FIG. 3) forming a vertical contact surface (24), but the bottom (23) is continuous with the pipe, so as not to create a recess within which sediment might collect. The gate assembly (25) is shaped to mate with this seal area, having a circular area (21) which seals with area (24) in seal area (5) surrounding the pipe inlet/outlet (2), and a lower area (26), which seals against the bottom (23) of the gate chamber (3).

The invention uses a novel construction of the gate assembly (25) to accomplish an improved seal with minimized activation resistance. The gate assembly has two closure disks (14) and (16), preferably of ductile iron, as in conventional double-disk gate valves. The area (13) between the disks is filled with a resilient elastomer material (15), preferably soft rubber, neoprene or other synthetic material, with a hardness of preferably 35–40 Durometer (although a wide range of Durometer values would work). The stem nut (11) is attached to an arcuate cross-member (20), which is placed over the top of the resilient material (15). The cross member (20) is preferably made of metal, such as bronze or stainless steel, and is formed in one piece with the stem nut (11), although a two-piece construction is possible.

The entire gate assembly is then preferably encased in a harder rubber or plastic coating (17), preferably having a Durometer of approximately 70–75 (although, as noted for the interior material, a wide range of Durometer values would work). The harder coating (17) provides for wear resistance and decreased friction, as well as holding the entire assembly (25) together into a unified whole.

In use, the gate assembly (25) is lowered into the gate chamber (3) by the actuating mechanism (here shown as stem (9) threading into stem nut (11)). Because the disk assembly (25) is slightly narrower than the space between seal areas (5), there is little resistance to the sliding action of the gate. When the bottom of the disk assembly (26) makes contact with the bottom of the gate chamber (23), the actuating mechanism is turned further. This causes the cross-member (20) to press on the resilient material (15), squeezing the resilient material (15) and thus causing the disks (14) and (16) to move outward toward the seal areas (5). The actuating mechanism is turned until the peripheral seal area (21) on the gate assembly (25) is well sealed against the peripheral area (24) on the seal area (5). Wear on the gate assembly and resistance to actuation is significantly reduced since the gate assembly does not make contact with the seat while being moved between an open position and a closed position.

Preferably, a rigid tube (12), preferably fabricated of metal such as bronze or stainless steel, is provided in the center of the gate assembly (25). This allows the use of the gate assembly with an actuating mechanism of the kind shown in the figures, wherein the stem is fixed and space must be provided through the gate. The tube (12) both provides the space (19) for the stem (9), and also prevents the resilient material from pressing inward into the space when it is compressed by the cross-member (20). If necessary, the disks (14) and (16) may have shaped (22) so as to surround the tube (12) more closely. The tube (12) is not required for actuating mechanisms of the kind in which the stem moves upward and downward with the gate assembly, but for manufacturing simplicity it may be included nonetheless, permitting the use of one gate assembly with differing kinds of actuators.

Accordingly, it is to be understood that the embodiments of the invention herein described are merely illustrative of the application of the principles of the invention. It will be evident from the foregoing description that changes in the form, proportion and construction of the parts of the valve disclosed may be resorted to without departing from the spirit of the invention, or the scope of the appended claims.

What is claimed is:

1. A double disk gate assembly for a gate valve of the kind having a valve seat, in which the valve is actuated by an actuating mechanism linearly moving the gate assembly from a first open position to a second closed position in contact with the valve seat, the gate assembly comprising:

a) first and second closure disks, located parallel to and coaxial with each other, each said closure disk having an opposing surface, and said closure disks being spaced apart to thereby form a gap therebetween defined by and substantially coextensive with each said opposing surface of each said closure disk, such that said gap is about as long as each said opposing surface;

b) a resilient material substantially filling the gap between the first and second closure disks; and c) a cross-member located across substantially all of the upper surface of the resilient material, between the closure disks, the cross-member being connectable to the actuating mechanism;

such that when the gate assembly is moved from the first open position to the second closed position, the cross-member compresses the resilient material, causing the resilient material to press on the first and second closure disks.

2. The gate assembly of claim 1 wherein said resilient material is attached by adhesive to said closure disks of said gate assembly.

3. The gate assembly of claim 1, wherein said closure disks are of ductile iron.

4. The gate assembly of claim 1, further comprising a central tube located in the space between the closure disks.

5. The gate assembly of claim 4, wherein said tube is stainless steel.

6. The gate assembly of claim 1, wherein said resilient material has a Durometer in the range of 35–40.

7. The gate assembly of claim 1, wherein said resilient material is made of an elastomer chosen from the group comprising rubber, neoprene, or plastic.

8. The gate assembly of claim 1 wherein said gate assembly further comprises an outer coating, encasing the first and second closure disks, cross member and resilient material.

9. The gate assembly of claim 8, wherein said outer coating of said gate assembly is fabricated from an elastomer having a Durometer in the range of 70–75.

10. The gate assembly of claim 8 wherein said outer coating is fabricated from a transfer molded resinous material.

11. The gate assembly of claim 1 wherein said cross member is fabricated of metal.

12. The gate assembly of claim 11 wherein said metal is bronze.

13. The gate assembly of claim 1 wherein said cross member is formed integral with a stem nut.

14. An improved double disk gate valve of the kind having a valve seat, an inlet and an outlet, a gate assembly, and an actuating mechanism linearly moving the gate assembly from a first open position to a second closed position in contact with the valve seat, the improvement comprising the gate assembly comprising:

a) first and second closure disks, located parallel to and coaxial with each other, each said closure disk having an opposing surface, and said closure disks being spaced apart to thereby form a gap therebetween defined by and substantially coextensive with each said opposing surface of each said closure disk;

b) a resilient material substantially filling the gap between the first and second closure disks; and c) a cross-member located across substantially all of the upper surface of the resilient material, between the closure disks, the cross-member being connectable to the actuating mechanism;

such that when the gate assembly is moved from the first open position to the second closed position, the cross-member compresses the resilient material, causing the resilient material to press on the first and second closure disks.

15. The double-disk gate valve of claim 14 wherein said resilient material is attached by adhesive to said closure disks of said gate assembly.

16. The double-disk gate valve of claim 14, wherein said closure disks are of ductile iron.

17. The double-disk gate valve of claim 14, further comprising a central tube located in the space between the closure disks.

18. The double-disk gate valve of claim 17, wherein said tube is stainless steel.

19. The double-disk gate valve of claim 14, wherein said resilient material has a Durometer in the range of 35–40.

20. The double-disk gate valve of claim 14, wherein said resilient material is made of an elastomer chosen from the group comprising rubber, neoprene, or plastic.

21. The double-disk gate valve of claim 14 wherein said gate assembly further comprises an outer coating, encasing the first and second closure disks, cross member and resilient material.

22. The double-disk gate valve of claim 21, wherein said outer coating of said gate assembly is fabricated from an elastomer having a Durometer in the range of 70–75.

23. The double-disk gate valve of claim 21 wherein said outer coating is fabricated from a transfer molded resinous material.

24. The double-disk gate valve of claim 14 wherein said cross member is fabricated of metal.

25. The double-disk gate valve of claim 24 wherein said metal is bronze.

26. The double-disk gate valve of claim 14 wherein said cross member is formed integral with a stem nut.

* * * * *